United States Patent
Oh

(10) Patent No.: US 12,139,155 B2
(45) Date of Patent: Nov. 12, 2024

(54) CONTROL METHOD FOR BOOST MODE OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 229 days.

(21) Appl. No.: 18/070,205

(22) Filed: Nov. 28, 2022

(65) Prior Publication Data
US 2023/0331245 A1 Oct. 19, 2023

(30) Foreign Application Priority Data
Apr. 19, 2022 (KR) .................. 10-2022-0047922

(51) Int. Cl.
| | | |
|---|---|---|
| *B60W 50/08* | (2020.01) | |
| *B60W 30/182* | (2020.01) | |
| *B60W 50/14* | (2020.01) | |

(52) U.S. Cl.
CPC ........ *B60W 50/082* (2013.01); *B60W 30/182* (2013.01); *B60W 50/14* (2013.01); *B60W 2050/146* (2013.01); *B60W 2510/244* (2013.01); *B60W 2540/10* (2013.01)

(58) Field of Classification Search
CPC .. B60W 50/082; B60W 30/182; B60W 50/14; B60W 2050/146; B60W 2510/244; B60W 2540/10; B60W 2540/12; B60W 30/188; B60W 2510/0638; B60W 2510/0657; B60W 2510/081; B60W 2510/083; B60W 2510/087; B60W 30/18; B60W 30/18009; B60W 40/10; B60W 10/26; B60W 2510/0676; Y02T 10/70; Y02T 10/7072

See application file for complete search history.

(56) References Cited

U.S. PATENT DOCUMENTS

| | | | |
|---|---|---|---|
| 2012/0022753 A1* | 1/2012 | Vandekerkhove | ...... F16H 59/48 701/55 |
| 2012/0216531 A1 | 8/2012 | Schaffeld et al. | |
| 2012/0216533 A1* | 8/2012 | Schaffeld | ................ F02D 41/10 60/611 |
| 2012/0221223 A1 | 8/2012 | Schaffeld et al. | |

(Continued)

FOREIGN PATENT DOCUMENTS

| | | |
|---|---|---|
| JP | 2009114876 A | 5/2009 |
| KR | 1020170134540 A | 12/2017 |

*Primary Examiner* — Sizo B Vilakazi
(74) *Attorney, Agent, or Firm* — Morgan, Lewis & Bockius LLP

(57) ABSTRACT

A control method for a boost of a vehicle for increasing a boost mode use time by a driver and being able to maximize the acceleration performance and commercial value of a vehicle, includes entering, by a controller, the boost mode so that boost-driving is performed when there is input of boost mode-on by a user, obtaining, by the controller, real-time driving state variable information while the vehicle is driven in the boost mode, increasing or decreasing, by the controller, a durable boost time in accordance with the obtained real-time driving state variable information, and displaying, by the controller, the boost standby time which is changed, on a display device of the vehicle.

20 Claims, 10 Drawing Sheets

(56) References Cited

U.S. PATENT DOCUMENTS

| | | | |
|---|---|---|---|
| 2015/0009024 A1 | 1/2015 | Strasser | |
| 2015/0135706 A1* | 5/2015 | Takao | F02B 37/18 |
| | | | 60/602 |
| 2016/0369716 A1* | 12/2016 | Ossareh | F02D 41/0007 |
| 2021/0031748 A1* | 2/2021 | Watanabe | B60W 10/30 |
| 2023/0331244 A1* | 10/2023 | Oh | B60W 30/182 |
| 2024/0109417 A1* | 4/2024 | Seo | B60K 35/21 |

* cited by examiner

CONTROL METHOD FOR BOOST MODE OF VEHICLE

CROSS REFERENCE TO RELATED APPLICATION

The present application claims priority to Korean Patent Application No. 10-2022-0047922, filed Apr. 19, 2022, the entire contents of which is incorporated herein for all purposes by this reference.

BACKGROUND OF THE PRESENT DISCLOSURE

Field of the Present Disclosure

The present disclosure relates to a control method for a boost mode of a vehicle, and more particularly, to a control method for a boost mode, the method being able to increase a boost mode use time by a driver and being able to maximize the acceleration performance and commercial value of a vehicle.

Description of Related Art

Recently, drivers who regard performance or fun-driving of a vehicle as important are increasing and high-performance vehicles that can achieve a driving mode, which temporarily increases power performance, that is, a boost mode have been released in response to such demands.

In general, a driver of a vehicle which may be driven in a boost mode can enter the boost mode by pressing a button at a steering wheel, etc. In driving-operation for accelerating the vehicle. When entering the boost mode, the driver can activate boost driving and operation of the vehicle through driving-operation.

Regular specifications of a driving apparatus are provided to vehicles, but a boost mode is set so that performance slightly over such regular specifications can be temporarily implemented to prevent damage to the drivetrain and maximize the acceleration performance of a vehicle.

When a boost mode is entered, the maximum output of a driving apparatus (a power apparatus such as an engine and a motor) for driving a vehicle may be instantaneously increased, and power may be increased up to the maximum output within a predetermined time period (e.g., 10 seconds).

Meanwhile, a boost mode that can prevent damage to a drivetrain and maximize acceleration performance is applied to vehicles, but, in many cases, the durable time of boost-driving, etc. are substantially conservatively managed to secure durability of a drivetrain.

That is, even though it is possible to substantially continuously use boost-operation for a longer time in terms of a driving apparatus, boost-driving may be stopped in some cases in consideration of only a predetermined single condition, for example, a predetermined durable time condition.

This limits the performance of a vehicle to prevent boost-driving from being used over a conservatively set durable time of a boost for reasons such as securing durability of a drivetrain even though boost-driving may be used for longer time.

As described above, a limitation of the related art is that the acceleration performance and commercial productivity of a vehicle cannot be maximized because the durable time of a boost function is conservatively set for securing durability of a drivetrain.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control method for a boost mode, the method being able to variably manage a durable boost time by reflecting both current drivetrain state information and driving input information by a driver and to increase a use time of boost-driving, being able to maximize acceleration performance and commercial value of a vehicle including a boost function.

The objectives of the present disclosure are not limited to those described above and other objectives not stated herein would be apparently understood by those who have ordinary skills in the art that the present disclosure belongs to (hereafter, "those skilled in the art") from the following description.

To achieve the objectives, according to an exemplary embodiment of the present disclosure, there is provided a control method for a boost of a vehicle that includes: entering, by a controller, the boost mode so that boost-driving is performed when the controller receive an input of boost mode-on from a user; obtaining, by the controller, real-time driving state variable information while a vehicle is driven with the boost mode; increasing or decreasing, by the controller, a durable boost time in accordance with the obtained real-time driving state variable information; and displaying, by the controller, the boost standby time which is changed, on a display device of the vehicle, wherein the durable boost time is a remaining time for which a driving state of the vehicle may be maintained after the boost mode is entered.

Therefore, according to the control method for a boost mode of the present disclosure, there is an effect that it is possible to variably manage a durable boost time by reflecting both current drivetrain state information and driving input information by a driver and to increase a use time of boost-driving, being able to maximize acceleration performance and commercial value of a vehicle including a boost function.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
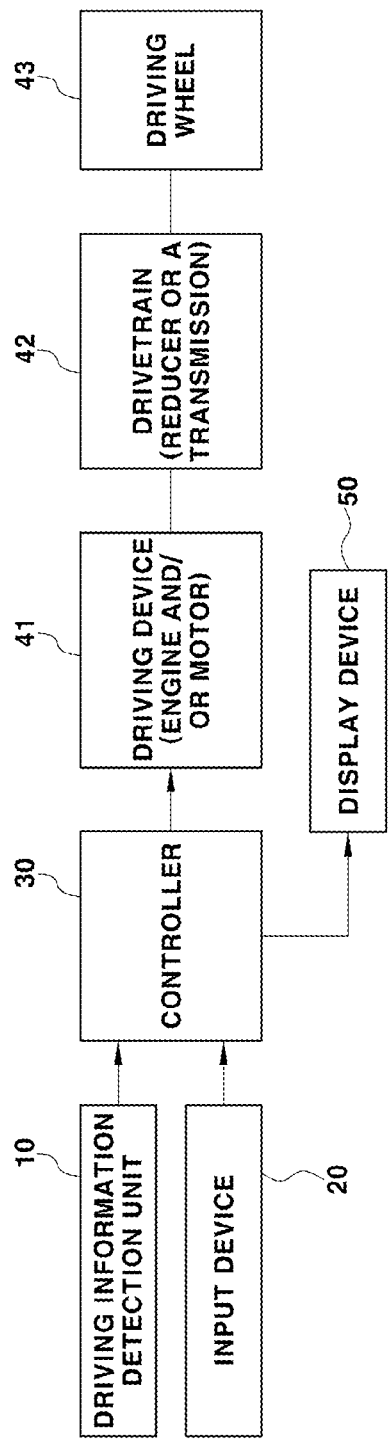
FIG. 1 is a block diagram showing the configuration of a system for performing a boost mode according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Embodiments of the present disclosure will be described hereafter in detail with reference to the accompanying drawings. Description of predetermined structures and functions included in embodiments of the present disclosure are only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, but these elements may not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

In the present disclosure, a durable boost time (remaining available boost time) is determined and provided as information for a driver to use a boost mode in real time in accordance with a vehicle driving situation. In the present disclosure, it is possible to determine and change a durable boost time in consideration of current drivetrain state information and a driver driving input value that are real-time vehicle driving information.

In the present disclosure, it is an objective to maximize a durable boost time (available boost time) without damaging a vehicle driving source, that is, a driving apparatus of driving a vehicle such as an engine or a motor, and other apparatuses and parts in a drivetrain including the driving source, and a durable boost time is determined in consideration of factors which may damage to the vehicle driving source, that is, damage factors in real time.

In the present disclosure, a durable boost time which is fundamentally provided in accordance with the damage factors is variably adjusted, but a durable boost time value may decrease or the reduction ratio may increase due to an increase of the damage factors, or the durable boost time value may increase or the reduction ratio may decrease due to a decrease of the damage factors.

Alternatively, when a driver gives input (e.g., operates a button) to enter a boost mode but boost-driving does not need to be used, it may be possible to maintain the current durable boost time without variation.

FIG. 1 is a block diagram showing the configuration of a system for performing a boost mode according to an exemplary embodiment of the present disclosure. In FIG. 1, in addition to components configured to control a boost mode in a vehicle, an input device 20, a display device 50, components configured to control driving of a vehicle, and a vehicle drivetrain are shown.

As shown in the figures, a system for performing a boost mode according to an exemplary embodiment of the present disclosure is mounted and provided in a vehicle and includes a driving information detection unit 10 that detects vehicle driving information, a controller 30 that generates and outputs torque instruction for driving a vehicle based on the vehicle driving information detected by the information detection unit 10, and a driving device 41 which is controlled to drive a vehicle in accordance with torque instruction output from the controller 30.

The information detection unit 10 is a component that detects automotive driving information for controlling and performing a boost mode of a vehicle and controlling driving of a vehicle, and real-time automotive driving information which is detected by the automotive driving information 10 is input to the controller 30. In the present disclosure, the vehicle driving information which is detected by the driving information detection unit 10 may include driving input information by a driver and vehicle state information.

The driving information detection unit 10 may include an accelerator pedal detection unit that detects an accelerator pedal input value according to operation of an accelerator pedal by a driver, and a brake pedal detection unit that detects a brake pedal input value according to operation of a brake pedal by a driver.

The accelerator pedal detection unit may be a common accelerator position sensor (APS) which is provided on an accelerator pedal and outputs an electrical signal according to an accelerator pedal operation state by a driver. The brake pedal detection unit may be a common brake pedal sensor (BPS) which is provided on a brake pedal and outputs an electrical signal according to a brake pedal operation state by a driver.

The driving input information by a driver of the vehicle driving information includes an accelerator pedal input value (APS value) which is a driving input value according to accelerator pedal operation by a driver and is detected by the accelerator pedal detection unit, and a brake pedal input value (BPS value) which is a driving input value according to brake pedal operation by a driver and is detected by the brake pedal detection unit.

The driving information detection unit 10 may further include a speed detection unit that detects a rotation speed of a vehicle drivetrain, and in the instant case, vehicle state information of the vehicle driving information includes a rotation speed of a vehicle drivetrain (drivetrain speed) which is detected by the speed detection unit.

In the present disclosure, the drivetrain speed may be the rotation speed of the driving device 41, that is, the rotation speed of a motor (motor speed), the rotation speed of an engine (engine speed), the rotation speed of a driving wheel 43 (driving wheel speed), or the rotation speed of a driveshaft (driveshaft speed).

The speed detection unit may be a common engine revolutions per minute (rpm) sensor which is configured to detect an engine speed or a common resolver which is mounted on a motor, or a common speed sensor which is provided on the driving wheel 43 or a sensor that can detect a driveshaft speed.

In the present disclosure, the driving information detection unit 10 may further include a temperature sensor configured to detect drivetrain temperature, and in the instant case, the vehicle state information of the real-time vehicle driving information further includes drivetrain temperature. The drivetrain temperature is temperature of an apparatus or a portion in a drivetrain and may be detected by the temperature sensor.

The drivetrain temperature may be the temperature of the driving device 41 of a vehicle drivetrain or the temperature of a driveshaft which is a drivetrain portion, and may be, other than temperature detected by the temperature sensor, the temperature of an apparatus or a part in a drivetrain which is estimated based on other sensor detection information or information collected from a vehicle.

The drivetrain temperature may be the temperature of a Power Electronic (PE) portion of an electric vehicle and the PE portion may be a motor of the driving device 41 or may be an inverter for driving and controlling the motor.

The vehicle state information of the real-time vehicle driving information may include, as drivetrain state variables showing states related to a drivetrain, may include, in addition to the drivetrain speed and the drivetrain temperature, information of drivetrain torque, drivetrain power, drivetrain durability, and state of charge of a battery (hereafter, referred to as a 'battery SOC').

The drivetrain torque may be driver request torque (torque instruction) which is determined from the real-time vehicle driving information by the controller 30.

The drivetrain power may be a value which is obtained from the drivetrain speed and the drivetrain torque, driver request power which is obtained from an accelerator pedal input value by a driver and a vehicle speed by a driving power map, or driver request power which is obtained from a brake pedal input value by a driver and a vehicle speed by a braking power map.

Furthermore, the drivetrain power may be motor charge and discharge power in an electrified vehicle, a power-related variable determined for PE parts (a motor, an inverter, etc.), power-related control variable for controlling a vehicle of devices in a vehicle, drivetrain power-related variable which is determined in a control process, or the like.

The drivetrain durability means the durability of devices or parts in a drivetrain. The drivetrain durability may be a variable related to the total mileage of a vehicle, a model year of a vehicle, or durability which is determined from the total mileage or the model year by the controller 30, or may be durability state information of a drivetrain which is internally estimated by the controller 30.

Generally, using durability state information for controlling a vehicle or devices in a vehicle, a diagnosis process for estimating a durability state, etc. have been known to those skilled in the art, and the diagnosis process for estimating a durability state is well known in the art, so that the diagnosis process is not described in detail.

The battery SOC is real-time battery state information which is received from a Battery Management System (BMS). In the instant case, the battery, which is a battery connected to a motor, which is the driving device 41, to be able to be charged and discharged through an inverter, is a battery that supplies power for operating a motor.

In control of a boost mode according to an exemplary embodiment of the present disclosure, all of information including the drivetrain temperature, the drivetrain speed and torque, the drivetrain power, the drivetrain durability, the battery SOC, etc., which are drivetrain state information and diagnosis information of the vehicle state information may be used by the controller 30, or at least one of the items of information may be selectively used to change a boost-driving relevant time.

Though not exemplarily shown in detail in FIG. 1, the controller 30 may include a first controller that determines, generates, and outputs a torque instruction based on real-time vehicle driving information, and a second controller that is configured to control operation of the driving device 41 based on the torque instruction which is output from the first controller.

The first controller may be an upper controller that generates and outputs a torque instruction based on vehicle driving information in a common vehicle, for example, a vehicle controller (VCU) which is an upper controller of an electric vehicle or a hybrid controller (HCU) which is an upper controller of a hybrid vehicle.

The second controller is a lower controller that performs cooperative control with the first controller which is an upper controller, and is configured to control operation of the driving device 41 in response to the torque instruction which is output from the first controller.

The second controller may be a common motor controller (MCU) that drives a motor through an inverter and is configured to control operation of the motor in an electric vehicle. Alternatively, the second controller may be a common engine controller (ECU) that drives and is configured to control an engine or may mean both a motor controller and an engine controller.

In the present disclosure torque and rotation force that are output from the driving device 41 is, as shown in FIG. 1, transmitted to a driving wheel 43 through a drivetrain element 42 such as a reducer, a transmission, or a driveshaft.

In the present disclosure, the first controller and the second controller are involved with boost mode control and driving control of a vehicle, and a boost mode control process and a driving control process including the boost mode control process according to an exemplary embodiment of the present disclosure may be performed also by one integrated control element instead of such a plurality of controllers.

A plurality of controllers and one integrated control element may be commonly referred to as a controller and the control process of the present disclosure may be performed by the commonly-called controller. In the following description, the controller may be a commonly called name of the first controller and the second controller.

As will be described below, the controller 30, in the present disclosure, variably determines and manages a durable boost time (available boost time) in accordance with real-time vehicle driving information which is detected by the driving information detection unit 10 or collected in a vehicle, that is, the vehicle state information (drivetrain state variable, etc.) and driving input information by a driver (driving input value such as an accelerator pedal input value).

The input device 20 is disposed in a vehicle so that a user can operate the input device 20 to enter a boost mode, and may include a button which may be operated to enter a boost mode.

When a driver operates the button of the input device 20, an electrical signal by operation of the button is input to the controller 30 and the controller 30 can recognize driver input for entering a boost mode, and later, the boost mode may be entered under control by the controller 30.

The input device 20 may include a separate input unit provided for a driver to be able to set or select a boost mode separately from the button. The separate input unit is provided so that information which is input by a driver may be transmitted to the controller 30, and may be a touch screen integrated with the display device 50, etc. As will be described below, in the present disclosure, a driver can input or select a setting value for a boost mode or select one of a plurality of boost modes through the input unit of the input device 20.

In the present disclosure, the boost mode may be defined as a mode in which the driving device 41 generates output exceeding set regular output, and for example, may be a mode in which an engine or a motor which is the driving device 41 is controlled to generate output exceeding regular output by relaxing a set output limit.

As a detailed example, the boost mode may include a process of increasing boost pressure of an engine and of increasing the fuel injection amount of the engine too by operating a turbo charger to increase the output of the driving device 41 to exceed regular output.

When a driver presses a button for entering a boost mode as the input device 320 in a common vehicle with an internal combustion engine, a turbo boost mode is entered, which is applied in the same way in the present disclosure.

The display device 50 informs a driver of information related to a current boost mode and is controlled by the controller 30 to display real-time information related to a boost mode, for example, a current available state of a boost or boost-driving relevant time information, information showing a boost operation state, etc.

The display device 50 may be at least one or more of various display devices provided in a vehicle. For example, the display device 50 may be one or both of a cluster display or a head-up display (HUD) that can display and provide information to a driver.

The configuration of a system for performing and controlling a boost mode according to an exemplary embodiment of the present disclosure was described above, and a method of performing and controlling a boost mode is described hereafter.

Figure 2:
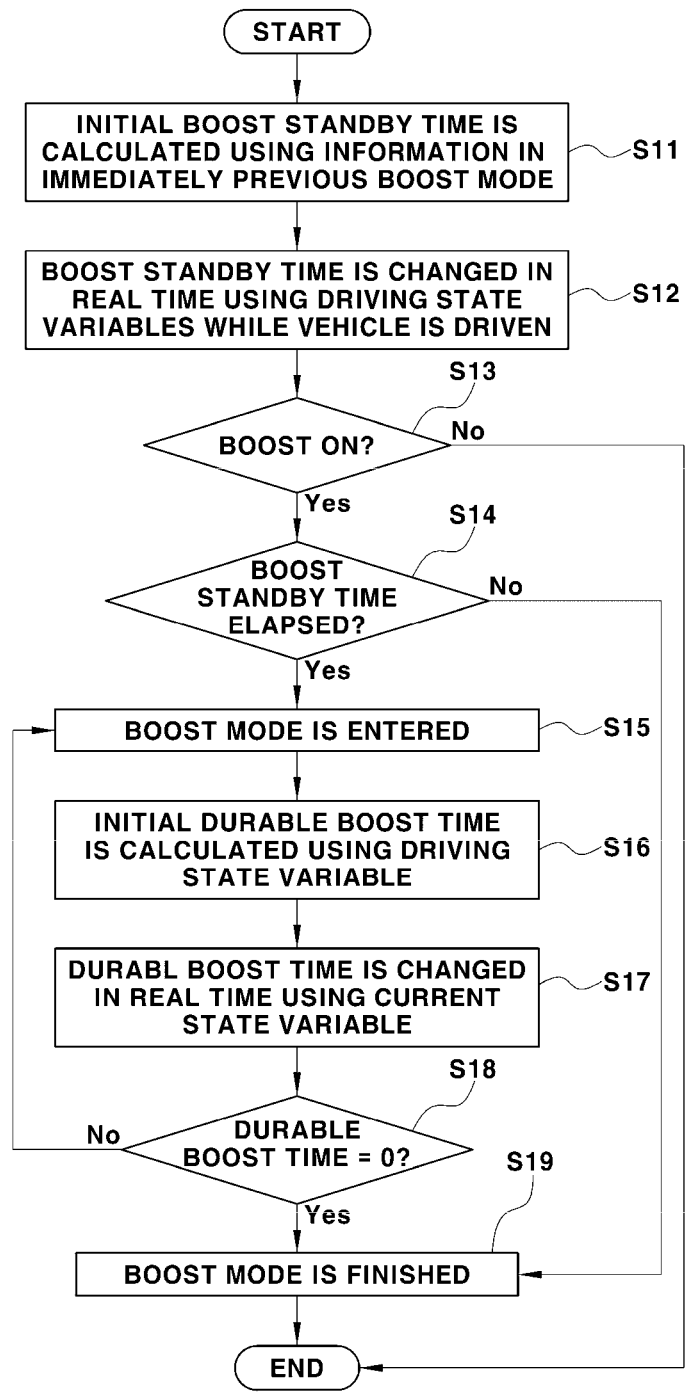
FIG. 2 is a flowchart showing a process of changing a boost-driving relevant time in real time in the present disclosure.

FIG. 2 is a flowchart showing a boost mode control process according to an exemplary embodiment of the present disclosure.

As shown in the figures, a controller is configured to determine an initial value of a remaining time until next available boost (boost standby time) (initial boost standby time) in accordance with driving state variable information in an immediately previous boost mode or boost-driving usage information in an immediately previous boost mode (S11), and changes the remaining time until next available boost (boost standby time) using a driving state variable while driving of a vehicle in the immediately previous boost mode (S12).

When a boost mode is turned on by a user (S13), the controller is configured to check whether the remaining time until next available boost (boost standby time) finally determined in the way described above has elapsed (S14), and enters a boost mode when the remaining time until next available boost (boost standby time) has fully elapsed (S15). of course, when the remaining time until next available boost has not fully elapsed, entering the boost mode and boost-driving are prohibited by the controller 30.

After entering the boost mode, the controller 30 makes the initial value of the durable boost time (initial durable boost time), which is determined using driving state variable information, be displayed on the display device (S16).

Thereafter, a driver can perform boost-driving, and as boost-driving is performed, the durable boost time gradually decreases. Furthermore, as boost-driving is performed, the durable boost time may be changed in real time using a current driving state variable (S17).

Thereafter, the controller is configured to check whether the durable boost time becomes 0 (S18), and finishes boost-driving and the boost-driving mode when the durable boost time becomes 0 (S19).

In the present disclosure, the controller 30 can make a durable boost time, which changes in real time, be displayed on the display device 50 and a boost standby time, which changes in real time, also be displayed on the display 50 with a boost mode turned on (entered).

Alternatively, the controller 30 may make the current boost standby time be displayed on the display device 50 only when a boost mode is turned off. In the instant case, a boost standby time that decreases with a predetermined reduction value or a predetermined reduction ratio over time is made be displayed on the display device 50.

As described above, the control method for a boost mode according to an exemplary embodiment of the present disclosure includes a process of determining a durable boost time and a remaining time until next available boost (boost standby time, cool time) based on real-time vehicle driving information which is collected in the vehicle, and is characterized by changing a durable boost time and a remaining time until next available boost in accordance with the vehicle state information (particularly, drivetrain state variables) and driving input information by a driver described above that are the real-time vehicle driving information. That is, the boost mode control processor according to an exemplary embodiment of the present disclosure may be considered as including a process of changing a durable boost time and a remaining time until next available boost.

The process of changing a durable boost time is simply referred to as follows before detailed description. In the present disclosure, the durable boost time means a durable boost time remaining after entering a boost mode, that is, a remaining time for which boost-driving of a vehicle may be performed (the amount of remaining boost).

A driver can check a durable boost time displayed on the display device 50 after entering a boost mode, and can keep the boost-driving state and the boost-operating state of the vehicle for the remaining durable boost time.

First, in the present disclosure, when a boost mode is entered when a vehicle is being accelerated, a constant durable boost time is not always applied and the durable boost time is changed in accordance with vehicle driving information which is collected and obtained in real time. The vehicle driving information, as described above, includes driving input information by a driver and vehicle state information, and in detail, the vehicle state information may be the drivetrain state variable described above.

In the present disclosure, driving input information by a driver of factors that determine and change a durable boost time may include a driving input value or setting value by a driver, and as a detailed example, may include an accelerator pedal input value showing acceleration intention of a driver. As described above, a durable boost time may be changed in accordance with acceleration intention and the degree thereof by a driver.

In the present disclosure, vehicle state information of factors that determine and change a durable boost time may include a drivetrain state variable. The drivetrain state variable includes, as state information and diagnosis information showing the state of a drivetrain, drivetrain temperature, drivetrain torque, a drivetrain speed, drivetrain power, drivetrain durability, a battery SOC, etc.

Similarly, in the present disclosure, when boost-driving is finished and a boost-mode is turned off, a constant remaining time until next available boost (boost standby time) is not always applied and the constant remaining time until next available boost (boost standby time) is changed in accordance with vehicle driving information which is collected and obtained in real time. The vehicle driving information, as described above, includes driving input information by a driver and vehicle state information, and in detail, the vehicle state information may include the drivetrain state variable described above.

In the present disclosure, driving input information by a driver of factors that determine and change a remaining time until next available boost (boost standby time) may include a driving input value by a driver, and as a detailed example, may include an accelerator pedal input value showing acceleration intention of a driver. As described above, a remaining time until next available boost (boost standby time) may be changed in accordance with acceleration intention and the degree thereof by a driver.

In the present disclosure, vehicle state information of factors that determine and change a remaining time until next available boost (boost standby time) may include a drivetrain state variable. The drivetrain state variable includes, as state information and diagnosis information showing the state of a drivetrain, drivetrain temperature, drivetrain torque, a drivetrain speed, drivetrain power, drivetrain durability, a battery SOC, etc.

Hereafter, the method of changing a durable boost time is described in more detail.

In an exemplary embodiment of the present disclosure, when a driver wants to enter a boost mode and applies input for entering a boost mode, for example, when a driver operates a button for entering a boost mode, the durable boost time is determined and then displayed through the display device 50 by the controller 30.

In an exemplary embodiment of the present disclosure, when boost-driving is finished and a boost mode is turned off, a remaining time until next available boost (boost standby time, cool time) is determined and then displayed through the display device 50 by the controller 30.

In an exemplary embodiment of the present disclosure, a durable boost time and a remaining time until next available boost are not necessarily defined in the unit of time such as 'second' or 'minute'. For example, as long as time is conceptually expressed and defined, such as the length of a bar graph or the position of an indicator of a gauge, and is expressed so that a driver can quantitatively recognize, it may be used to define a durable boost time and a remaining time until next available boost.

Figure 3:
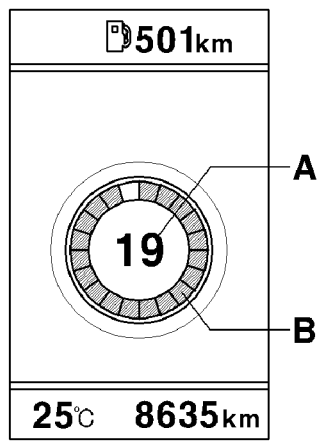
FIG. 3 is a diagram exemplarily showing the state in which a durable boost time is displayed on a display device in an exemplary embodiment of the present disclosure.

FIG. 3 is a view exemplarily showing the state in which a durable boost time is displayed through the display device 50, and the durable boost time may be displayed in various ways, as exemplified, as a boost-driving relevant time.

For example, a durable boost time may be displayed by a number A, may be displayed by a straight or circular bar graph B, or may be displayed by an indicator of a gauge. A remaining time until next available boost may also be displayed in the same way as the durable boost time.

In an exemplary embodiment of the present disclosure, first, an initial durable boost time (an initial value of a durable boost time) is provided and then reduced in real time, and the initial durable boost time may be determined and provided as a time according to a vehicle driving situation by the controller 30.

For example, 30 seconds may be provided as the initial durable boost time in accordance with a vehicle driving situation, and only 10 seconds may be provided as the initial durable boost time in accordance with a vehicle driving situation.

Alternatively, when circumstances are not permitted in accordance with a vehicle driving situation, it may be possible to inform a driver of the present situation by displaying information showing that boost cannot be used through the display device 50. When a durable boost time is set lower than a preset critical value, the controller 30 may be set to give a sign that boost cannot be used.

As the method of giving a sign that boost cannot be used, a message which may be understand as a state in which boost cannot be used may be displayed on the display device 50, 0 seconds may be displayed as a durable boost time, or a state of a bar graph or a position of an indicator gauge which may be understood as 0 seconds, which is a durable boost time, may be displayed.

As described above, an initial durable boost time that depends on a vehicle driving state is displayed through the display device 50 so that a driver can recognize the initial durable boost time.

In the following description, state variables of vehicle state information (drivetrain state variables) and driving input information by a driver (driving input value by a driver) that are needed to determine a durable boost time are integrally referred to as driving state variables.

In an exemplary embodiment of the present disclosure, when determining an initial durable boost time, one of a method based on driving state variable information at the determination time point (current time point) and a method based of driving state variable information for a past predetermined time period (which is a preset time) before the determination time point may be used.

When the driving state variable information for a past predetermined time period is used for determination, counting values or integration values of values that are used as input variables may be used. For example, it may be considered to decrease an initial durable boost time as the magnitude of a determined value, such as a duration time or a regenerative torque integration value, is large using the wide open throttle (WOT) duration time or regenerative torque integration value for 1 minute before boost starts to be used, that is, a time point of starting to use boost.

Not a method of uniformly reducing in real time an initial durable boost time in the unit of a set time (1 seconds or 0.1 seconds) after giving the initial durable boost time, as described above, but a range variation method of reducing time in accordance with a vehicle driving situation and a vehicle driving condition may be used.

For example, when the initial value of a durable boost time (initial durable boost time) which is provided every time by a driver who gives input (e.g., operates a button) for entering a boost mode is 20 seconds, the 20 seconds may be reduced in the unit of 1 seconds, which is a predetermined time period, and actually reduced only at 20 seconds, or time subtraction may be stopped for 5 seconds in the middle, so that the entire durable boost time may be 25 seconds.

Furthermore, it may be possible to accelerate or decelerate time subtraction rather than stopping time subtraction. Alternatively, it may be possible to increase a durable boost time which is remaining available boost time, depending on a vehicle driving situation. Accelerating time subtraction means that the speed of time subtraction gradually increases, and decelerating time subtraction means that the speed of time subtraction gradually decreases.

Meanwhile, in the method of changing a durable boost time, it may be further considered to change the initial value of a remaining time until next available boost (initial remaining time until next available boost).

Furthermore, in the present disclosure, a remaining time until next available boost (boost standby time, cool time) for using boost is determined and provided as information for using a boost mode to a driver in real time in accordance with a vehicle driving situation.

In the present disclosure, it is possible to determine and change a remaining time until next available boost in consideration of current drivetrain state information and a driver driving input value that are real-time vehicle driving information. That is, a remaining time until next available boost may be changed, for example, decreased or increased in real time in accordance with current drivetrain state information and a driver driving input value.

The remaining time until next available boost may be increased only when boost-driving is actually performed in a boost mode while a vehicle is driven, and the remaining time until next available boost may be decreased when boost-driving is not actually performed even in a boost mode.

When a durable boost time which is changed in real time completely elapses while boost-driving is performed after a boost mode is entered by a driver, boost-driving may be automatically finished and the boost mode may be turned off.

To enter again a boost mode and perform boost-driving later after boost-driving is finished and the boost mode is turned off, it is required to stop boost-driving for an appropriate time after finishing boost-driving and stopping the boost mode. Such stopping of boost-driving is required to secure durability of the parts and apparatuses of a drivetrain related to driving, including a driving apparatus of driving a vehicle, and to protect them.

That is, to enter again a boost mode and use again boost-driving after finishing boost-driving and turning off the boost mode, a rest for keeping boost-driving stopped after stopping boost-driving is required, and the time of a rest required for entering again boost mode and performing again boost-driving later may be considered as the remaining time until next available boost.

The remaining time until next available boost may be defined as a rest time for keeping boost-driving stopped (rested) and standing by to enter again a boost mode and use again boost-driving, and may be defined as a standby time remaining until it is possible to enter a boost mode and use boost-driving later.

When a boost mode is turned off, the controller 30 makes a remaining time until next available boost be displayed on the display device 50 and prohibits entering the boost mode and boost-driving until the remaining time until next available boost fully elapses.

In the present disclosure, the remaining time until next available boost may be referred to as a 'boost standby time' or 'cool time'. In the present disclosure, 'boost standby time', 'remaining time until next available boost', and 'cool time' are used as the same meaning. The remaining time until next available boost is briefly referred to as a 'boost standby time' in the following description.

In the present disclosure, the controller 30 makes a durable boost time be displayed on the display device 50 until a boost mode is turned off after it is entered, and makes a boost standby time (remaining time until next available boost), which is required to enter again a boost mode later, be displayed on the display device 50 after a boost mode is turned off.

Because boost-driving and boost operation are applied in a constant and repetitive situation under specific vehicle driving conditions such as track racing in many cases, it may be important to give an expectable initial boost standby time (initial value of a boost standby time).

Accordingly, the present disclosure proposes a method of not giving the initial value of a boost standby time (remaining time until next available boost or cool time) which is taken until a boost is used later after finishing duration of a boost, that is, an initial boost standby time always as a constant value, but variably determining and displaying the initial value in accordance with vehicle driving information.

In the instant case, the initial boost standby time may be determined and managed as a disposable, and it is possible to use driving state variable information in a previous boost mode or boost-driving usage information in an immediately previous boost mode to determine the initial boost standby time.

That is, the controller 30 determines an initial boost standby time for entering a boost mode again using driving state variable information in a previous boost mode or boost-driving usage information in an immediately previous boost mode.

The driving state variable information may be the driving state information and driving input information by a driver that are required to determine a boost standby time, and in detail, the driving state information, as described above, may include a drivetrain state variable. The driving input information by a driver may be one or both of an accelerator pedal input value (APS value) and a brake pedal input value (BPS value). A durable boost time in an immediately previous boost mode may be used as boost-driving usage information in an immediately previous boost mode.

For example, it is assumed that 20 seconds is displayed through the display device 20 as an available initial boost standby time to be provided to a driver as real-time information related to a boost mode except for exceptional situations when a boost mode is entered, and it is required to stand by for 10 seconds as a new initial boost standby time to entering again a boost mode later when a durable boost time elapses or is finished after a boost mode is entered.

In the instant case, when boost-driving is not actually performed (a boost is not used) even though there is input (operation of a button) for entering a boost mode by a driver in an immediately previous boost mode, an initial boost standby time for entering again a boost mode later may be reduced to 0 seconds rather than 10 seconds described above.

That is, when there is no boost-driving operation by a driver (input for boost-driving by a driver) after a button for entering a boost mode is operated, 0 seconds may be displayed through the display device 50 as an initial boost standby time after the boost mode is turned off later. This informs a driver that boost-driving may be immediately used again.

However, when a driver maintains boost-driving and a durable boost time decreases under a predetermined set time after a boost mode is entered while a vehicle is driven, the driver determines that boost-driving was considerably used, and the controller 30 can increase an initial boost standby time for entering again a boost mode later by a predetermined time period and can make the increased boost standby time be displayed on the display device 50.

For example, when a driver used boost-driving by a considerable amount, the controller 30 can extend an initial boost standby time for using again boost-driving to 30 seconds and make the extended time 30 seconds be displayed on the display device 50 as an initial boost standby time.

When a driver performs boost-driving and a durable boost time decreases under a predetermined set time in an immediately previous boost mode, the controller 30 can increase the initial value of the boost standby time by a predetermined time period.

It may also be possible to determine an initial boost standby time based on a driving state variable for a predetermined time period before previous boost-driving finishes being use, and in the instant case, counting values or integration values of values that are used as input variables may be used.

For example, it may be considered to increase an initial boost standby time as the magnitude of a determined value, such as a duration time or a regenerative torque integration value, is large using the wide open throttle (WOT) duration time or regenerative torque integration value for 1 minute before immediately previous boost-driving finishes being used.

It was described above to determine and determine an initial value of a remaining time until boost-driving may be used again, that is, an initial boost standby time (cool time) as a disposable, and then, it is possible to determine and change a boost standby time in real time from the initial value.

To determine and change a boost standby time in real time in the instant case and not a driving state variable in an immediately previous boost mode, but a driving state variable when a boost standby time is currently being consumed and elapsing may be used.

The fact that a boost standby time is currently being consumed and elapsing may be a state in which a boost standby time is decreasing. Furthermore, the state in which a boost standby time is being consumed and elapsing may be considered as a standby state for using again boost-driving and a state (rest state) in which boost-driving is stopped to use again boost-driving.

In the present disclosure, the method of determining and changing a boost standby time described above may be applied in combination of the method of changing a durable boost time described above. Furthermore, it is possible to enable a driver to select one of the methods for a boost mode described above through the input device 20.

Meanwhile, in an exemplary embodiment of the present disclosure, a durable boost time and a boost standby time may be changed in accordance with a driving input value and a setting value by a driver, and variation factors may include an accelerator pedal input value (APS value) and a brake pedal input value (BPS value) that are driving input value by a driver of driving state variables. That is, a durable boost time and a boost standby time may be changed in accordance with an accelerator pedal input value and a brake pedal input value.

Not only the durable boost time and boost standby time, but the initial durable boost time (initial value of a durable boost time) and the initial boost standby time (initial value of a boost standby time) may also be determined and changed in accordance with an accelerator pedal input value and a brake pedal input value.

In the following description, a boost-driving relevant time is a meaning that includes all of a durable boost time, a boost standby time, and an initial durable boost time and an initial boost standby time that are initial values thereof.

Furthermore, in the following description, unless specifically discriminated or designated, variation of time is a meaning that includes all of not only variation of a durable boost time and a boost standby time, but variation of an initial durable boost time and variation of an initial boost standby time.

Furthermore, in the following description, an increase and a decrease of time are meanings that include not only an increase and a decrease of a durable boost time and a boost standby time, but an increase and a decrease of an initial durable boost time and variation of an initial boost standby time.

In general, because acceleration torque (driving torque) and regenerative torque are applied through a motor in accordance with accelerator pedal input (operation) and brake pedal input (operation) by a driver in an electric vehicle, a load by the pedal input is applied to power electronic (PE) parts such as a motor, an inverter, and a battery.

Accordingly, a durable boost time (the amount of remaining boost) of the boost-driving relevant time should be decreased as much as the load, and the larger the pedal input amount and the longer the pedal input, the longer the durable boost time should be set.

On the other hand, a boost standby time of the boost-driving relevant time should be increased as much as the load, and the larger the pedal input amount and the longer the pedal input, the longer the boost standby time should be set.

When there is no accelerator pedal input and brake pedal input, a load is not applied to the power electronic parts, so that the durable boost time (the amount of remaining boost) may be correspondingly increased and the boost standby time may be correspondingly decreased.

To the present end, the controller 30 can increase or decrease the boost-driving relevant time into a value corresponding to a pedal input value (APS value or BPS value) which is a driving input value by a driver. In the instant case, the controller 30 may use a map and an increment/decrement and an increase/decrease ratio of the boost-driving relevant time may be determined by the map based on a driving input value by a driver.

Even though a pedal input value (APS value or BPS value) which is a driving input value by a driver is 0, coating regeneration may be performed in accordance with a vehicle speed or a setting value, and driving force is generated even though a pedal input value is 0 in creep.

As described above, because a load on power electronic (PE) part such as a motor is not 0 even though the pedal input value is 0, in accordance in accordance with setting of the controller 30, it is required to change a boost-driving relevant time in consideration of both the load on power electronic parts and a pedal input value.

That is, an increment/decrement or an increase/decrease ratio of a boost-driving relevant time may be set in the map in accordance with a pedal input value considering the load on power electronic parts, and accordingly, it is possible to change the boost-driving relevant time in accordance with a pedal input value considering the load.

A plurality of boost modes may be set in the controller 30. In the instant case, the boost modes may be modes including different boost widths and boost-driving relevant times. The boost-driving relevant time may be one or both of an initial durable boost time and an initial boost standby time.

First, an example in which a durable boost time of the boost-driving relevant time is differently set in each boost mode and an example in which a drive freely sets an initial durable boost time are described.

In the present disclosure, a value showing an available excessive boost amount for regular output is defined as a boost width. That is, the boost width may be defined as a value showing an output amount (the boost amount) that can exceed regular output. In detail, the boost width may be defined as a ratio (%) of the available excessive output amount for the regular output when the regular output, which is the maximum output in normal operation rather than a boost mode, is set in the controller 30.

In the preset disclosure, a boost width and an initial durable boost time may be set in advance for each boost mode in the controller 30. In the boost modes, the smaller the boost width, the longer the initial durable boost time is set.

In an exemplary embodiment of the present disclosure, a plurality of boost modes may include a first boost mode which is a default mode, a second mode which is a maximum durable time mode, and a third boost mode which is a maximum boost amount mode.

The first boost mode may be a mode in which a boost width and an initial durable boost time are set as values between the maximum value and the minimum value within predetermined available ranges, respectively, and in detail, may be a mode in which a boost width and an initial durable boost time are set as medium values between the maximum value and the minimum value within predetermined available ranges, respectively. The first mode may be used as a default mode in the controller 30.

The second boost mode is a mode in which an initial durable boost time is set as the maximum value within the set available range and the third boost mode may be a mode in which a boost width showing an available excessive boost amount for regular output is set as the maximum value within the set available range.

In a plurality of boost modes, a boost width may be set as the minimum value within an available range in a mode in which an initial durable boost time is set as the maximum value within an available range, but an initial durable boost time may be set as the minimum value within an available range in a mode in which a boost width is set as the maximum value within an available range.

For example, in the first boost mode, boost-driving is possible up to an excessive output amount (boost amount) of 10% for regular output (10% boost width) and an initial durable boost time may be set as 15 seconds.

In the instant case, in the second boost mode, boost-driving is possible up to an excessive output amount (boost amount) of 5% for regular output (5% boost width) and an initial durable boost time may be set as 30 seconds which is a maximum value.

Furthermore, in the third boost mode, boost-driving is possible up to an excessive output amount (boost amount) of 15% for regular output (15% boost width) and an initial durable boost time may be set as 5 seconds.

As described above, a plurality of boost modes including different boost widths and initial durable boost times may be set in advance and used in the controller 30 and a driver can select one of the plurality of boost modes through the input device 20.

Although an example in which a total of three boost modes are set is described above, this is only an example and does not limit the present disclosure and the number of boost modes may be variously changed.

For example, the present disclosure is not limited to a total of three boost modes, and at least one or more boost modes in which one of an initial durable boost time and a boost width is set as a value between a maximum value and a minimum value may be additionally set, independently from the default mode, between a boost mode in which an initial durable boost time is a maximum value (a maximum durable time mode) and a boost mode in which a boost width is a maximum value (maximum boost amount mode). That is, four, five, or more boost modes may be set.

As for a setting value in each boost mode in the controller 30, a driver may select a desired value from setting values of boost widths and initial durable boost times in boost modes or may change the setting values between the minimum durable time mode and the maximum boost amount mode.

Instead of setting and managing a predetermined number of boost modes in a preset type in the controller 30, it is possible to enable a driver to change a boost width and an initial durable boost time into continuous values between a maximum value and a minimum value regardless of modes in boost-driving through the input device 20.

That is, it is possible to enable a driver to set an initial durable boost time while continuously decreasing from a maximum value through the input device 20 in boost-driving. In the instant case, a boost width may be automatically changed in accordance with an increase/decrease of the initial durable boost time and may be automatically increased/decreased by a predetermined amount or at a predetermined ratio when the initial durable boost time is increased/decreased. For example, when an initial durable boost time increases, a boost width may be decreased in accordance with an increase or an increase ratio of a value that depends on the increase or increase ratio of the initial durable boost time.

Similarly, when setting a boost width in boost-driving, it is possible to enable a driver to continuously decrease the boost width from a maximum value through the input device 20. In the instant case, an initial durable boost time may be automatically changed in accordance with an increase/decrease of the boost width and may be automatically increased/decreased by a predetermined amount or at a predetermined ratio when the boost width is increased/decreased.

Although a plurality of boost modes that have different boost widths and initial durable boost times was described above, a plurality of boost modes that have different boost widths and initial durable boost time may be set in the controller 30.

The initial durable boost time may be replaced with an initial boost standby time in the above description, but, in respect of only differences, the plurality of boost modes are modes including different boost widths and initial boost standby time. In the boost modes, the larger the boost width, the longer the initial boost standby time is set.

In an exemplary embodiment of the present disclosure, a plurality of boost modes may include a fourth boost mode which is a default mode, a fifth mode which is a minimum standby time ode, and a sixth boost mode which is a maximum boost amount mode.

The fourth boost mode may be a mode in which a boost width and an initial boost standby time are set as values between the maximum value and the minimum value within predetermined available ranges, respectively, and in detail, may be a mode in which a boost width and an initial boost standby time are set as medium values between the maximum value and the minimum value within predetermined available ranges, respectively. The fourth boost mode may be used as a default mode in the controller 30.

The fifth boost mode is a mode in which an initial boost standby time is set as the minimum value within the set available range and the sixth boost mode may be a mode in which a boost width showing an available excessive boost amount for regular output is set as the maximum value within the set available range.

In a plurality of boost modes, a boost width may be set as the minimum value within an available range in a mode in which an initial boost standby time is set as the minimum value within an available range, but an initial boost standby time may be set as the maximum value within an available range in a mode in which a boost width is set as the maximum value within an available range.

For example, in the fourth boost mode, boost-driving is possible up to an excessive output amount (boost amount) of 10% for regular output (10% boost width) and an initial boost standby time may be set as 20 seconds.

In the instant case, in the fifth boost mode, boost-driving is possible up to an excessive output amount (boost amount) of 5% for regular output (5% boost width) and an initial boost standby time may be set as 5 seconds which is a minimum value.

Furthermore, in the sixth boost mode, boost-driving is possible up to an excessive output amount (boost amount) of 15% for regular output (15% boost width) and an initial boost standby time may be set as 40 seconds.

As described above, a plurality of boost modes including different boost widths and initial boost standby times may be set in advance and used in the controller 30 and a driver can select one of the plurality of boost modes through the input device 20.

Although an example in which a total of three boost modes are set is described above, this is only an example and does not limit the present disclosure and the number of boost modes may be variously changed.

As for a setting value in each boost mode in the controller 30, a driver may select a desired value from setting values of boost widths and initial boost standby times in boost modes or may change the setting values between the minimum standby time mode and the maximum boost amount mode.

Instead of setting and managing a predetermined number of boost modes in a preset type in the controller 30, it is possible to enable a driver to change a boost width and an initial boost standby time into continuous values between a maximum value and a minimum value regardless of modes in boost-driving through the input device 20.

As described above, it is possible to enable a driver to freely change a setting value into a desired value through the input device 20 in boost-driving by the controller 30.

Meanwhile, in an exemplary embodiment of the present disclosure, an initial durable boost time and an initial boost standby time of a boost mode may be dualized in accordance with whether a virtual shifting function is turned ON/OFF.

There has been known a method of generating and providing a virtual shifting feeling corresponding to vehicle driving information while a vehicle is driven when a driver turns on a virtual shifting function in an electric vehicle.

In well-known control methods for generating a virtual shifting feeling, a torque instruction of a motor that drives a vehicle is corrected to generate a virtual shifting feeling. Accordingly, when a driver turns on a virtual shifting function, operating points of power electronic (PE) parts such as a motor which is the driving device 41 to generate a virtual shifting feeling are changed.

A boost-driving relevant time when the virtual shifting function is turned on may be differently applied with respect to a boost-driving relevant time when the virtual shifting function is turned off so that such changes of operating points may be reflected.

In general, because using a boost is actually repeatedly turned on or off in accordance with an even and a point in time of virtual shifting for an effect of generating a virtual shifting feeling, there is an effect that a durable boost time increases and a boost standby time decreases when the virtual shifting function is used as compared with when the virtual shifting function is not used and a boost is actually continuously used.

Accordingly, an initial durable boost time may be made long when the virtual shifting function is turned on as compared with when the virtual shifting function is turned off. For example, when an initial durable boost time is set as 20 seconds when the virtual shifting function is turned off, an initial durable boost time may be set as 30 seconds when the virtual shifting function is turned on.

Furthermore, an initial boost standby time may be made short when the virtual shifting function is turned on as compared with when the virtual shifting function is turned off. For example, when an initial boost standby time is set as 30 seconds when the virtual shifting function is turned off, an initial boost standby time may be set as 20 seconds when the virtual shifting function is turned on.

Meanwhile, it was described above that the boost-driving relevant time is changed in accordance with drivetrain state variables. That is, it is possible to change in real time a boost-driving relevant time based on drivetrain temperature, drivetrain speed and torque, drivetrain power, drivetrain durability, a battery SOC, etc. In the present disclosure, which is described in more detail.

A durable boost time of a boost-driving relevant time may be changed in accordance with driving state variables, and a durable boost time which is changed in real time in accordance with drivetrain state variables in the controller 30 may be displayed on the display unit 50.

In the instant case, a map may be used in the controller 30 to determine in real time a durable boost time changed in accordance with a drivetrain state information. The map may be a map in which an increment/decrement or an increase/decrease ratio of a durable boost time is set as a value corresponding to drivetrain state variables.

That is, an increment/decrement or an increase/decrease ratio corresponding to a current drivetrain state may be determined by a map in the controller 30. When an increment/decrement or an increase/decrease ratio is determined by the map, the controller 30 determines a new durable boost time changed in accordance with the determined increment/decrement or increase/decrease ratio from the current durable boost time and makes the new durable boost time be displayed on the display device 50.

The durable boost time displayed on the display device 50 is continuously updated in the instant way in accordance with drivetrain state variables that are real-time information, and it is possible to enable a driver to check the durable boost time displayed on the display device 50.

As for the drivetrain temperature of the drivetrain state variables, when a load is applied in a period in which the drivetrain temperature is higher or lower than a normal range, the durability of the drivetrain may deteriorate. Accordingly, it is possible to change a durable boost time in accordance with drivetrain temperature and it is possible to increase a durable boost time in a temperature range which is out of a set normal range.

The drivetrain speed, drivetrain torque, and drivetrain power of the drivetrain state variables are variables related to a load or output of the drivetrain. First, the controller 30 monitors in real time a drivetrain operating point from real-time drivetrain speed and drivetrain torque information.

An operating point map may be used in the controller 30 to change a durable boost time. The operating point map may be a map in which a boost time consumption region and a boost time non-consumption region are set in advance with respect to the operating point of the driving device 41.

The boost time consumption region is a boost operation region in which boost-driving is actually performed and the boost time non-consumption region is a non-boost-driving region in which boost-driving is not performed.

Figure 4:
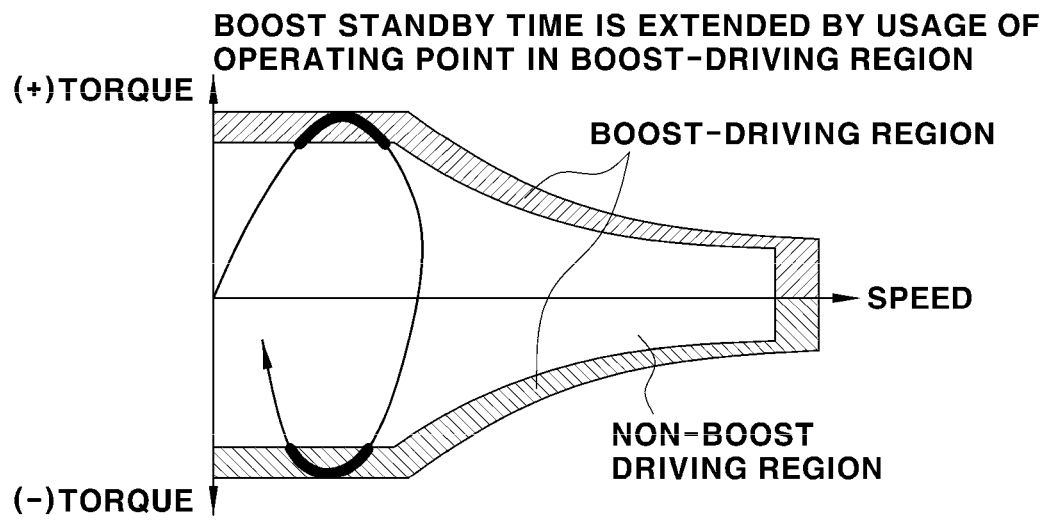
FIG. 4 and FIG. 5 are diagrams for describing an operating point map for determining and changing a durable boost time, and a method of using the operating point map in an exemplary embodiment of the present disclosure.
Figure 5:
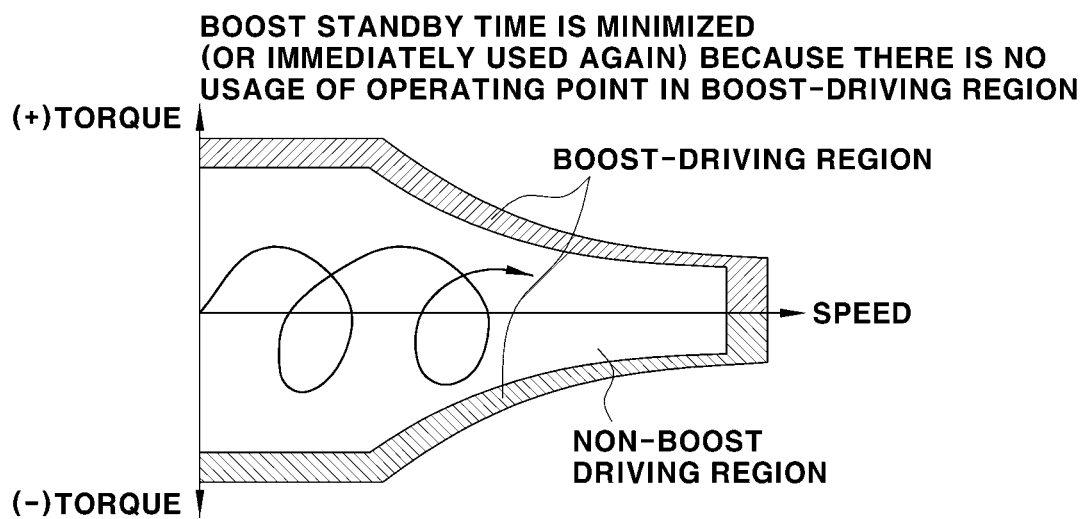

FIG. 4 and FIG. 5 are views for describing an operating point map for determining and changing a durable boost time and a method of using the operating point map in an exemplary embodiment of the present disclosure, in which a positive (+) torque region is a driving torque region and a negative (−) torque region is a regenerative torque region in the exemplified operating point map.

As shown in the figures, in the operating point map, an upper regular operating point limit and a lower regular operating point limit are set in advance, and the boost time consumption region and a boost time non-consumption region are separated with the upper regular operating point limit and the lower regular operating point limit therebetween.

Referring to FIG. 4 and FIG. 5, it may be seen that the upper regular operating point limit and the lower regular operating point limit are set as a drivetrain torque value that continuously changes in accordance with a drivetrain speed. In the instant case, the boost time consumption region and a boost time non-consumption region each include a driving torque region and a regenerative torque region.

The operating point map is input and stored in advance in the controller 30 and is used to determine and change a durable boost time. The controller 30 monitors an operating point which is determined in accordance with real-time drivetrain speed and drivetrain torque and determines which one of the boost time consumption region and a boost time non-consumption region the current driving state corresponds to in the operating point based on the monitored current operating point.

The region in which drivetrain torque (driving torque) exceeds the upper regular operating point limit in the driving torque region of the operating point map is a boost time consumption region, and the region in which drivetrain torque (regenerative torque) is less than the lower regular operating point limit in the regenerative torque region of the operating point map is a boost time consumption region. When defined without separating driving torque and regenerative torque, when the absolute value of drivetrain torque exceeds the absolute value of the upper regular operating point limit and the absolute value of the lower regular operating point limit, it may be determined as a boost time consumption region.

When the current operating point is in the boost time consumption region in the operating point map, the controller 30 determines that the current drivetrain state is a state in which a durable boost time should be extended, and increase the durable boost time in accordance with an increment/decrement or an increase/decrease ratio which is determined in accordance with the current operating point.

In the controller 30, the increment/decrement or an increase/decrease ratio of a durable boost time may be determined as a value corresponding to the difference between drivetrain torque and the upper regular operating point limit and the lower regular operating point limit (which is an excess from regular torque (output)).

However, when the current operating point is in the boost time non-consumption region, the controller 30 determines that the current drivetrain state is a state in which a durable boost time is not changed, and does not change and maintains the durable boost time.

As described above, the controller 30 monitors in real time the operating points of drivetrain elements, and does not increase and maintains a durable boost time when the current operating point is in a regular operating point range. The controller 30 decreases a durable boost time only when the current operating point comes out of a regular operating point range and boost-driving is actually performed.

Figure 6:
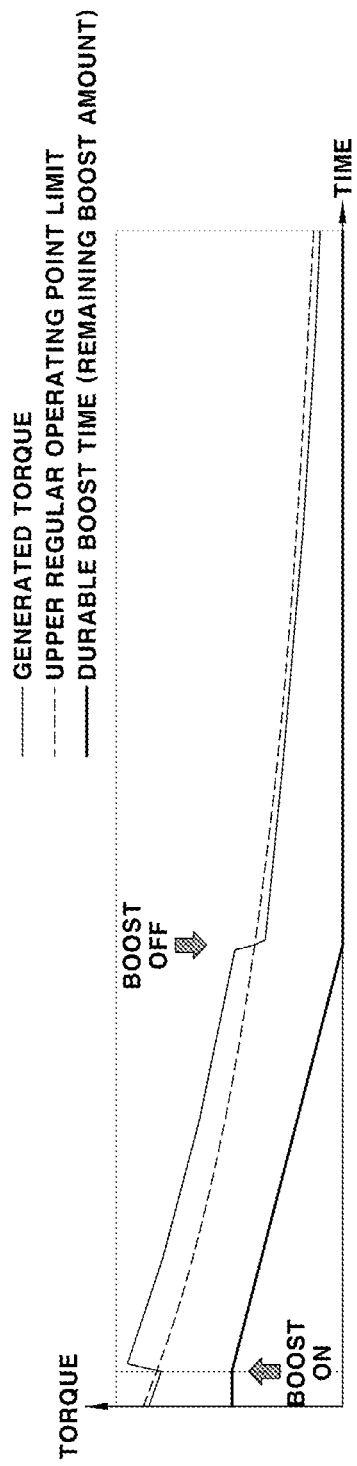
FIG. 6, FIG. 7, and FIG. 8 are diagrams exemplarily showing the state in which a durable boost time decreases in accordance with drivetrain torque of driving points of drivetrain elements in the present disclosure.
Figure 7:
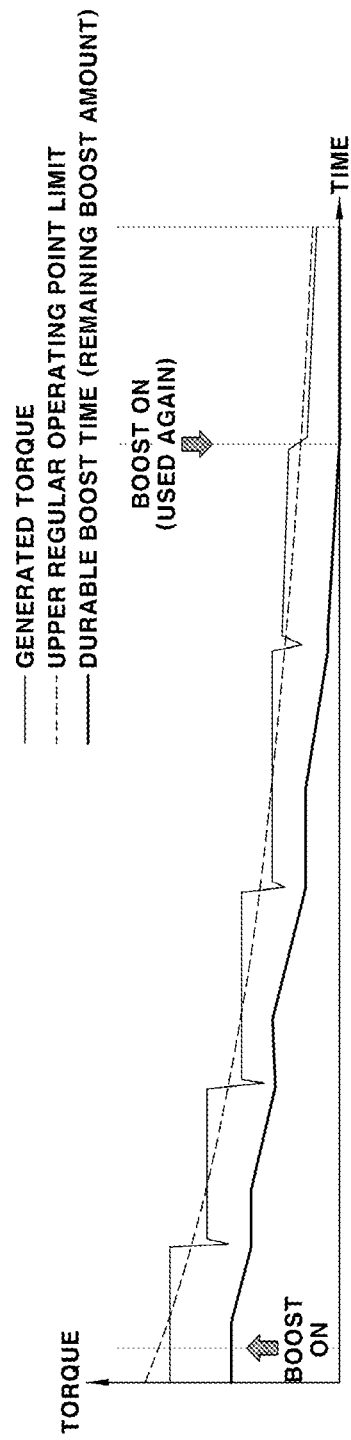
Figure 8:
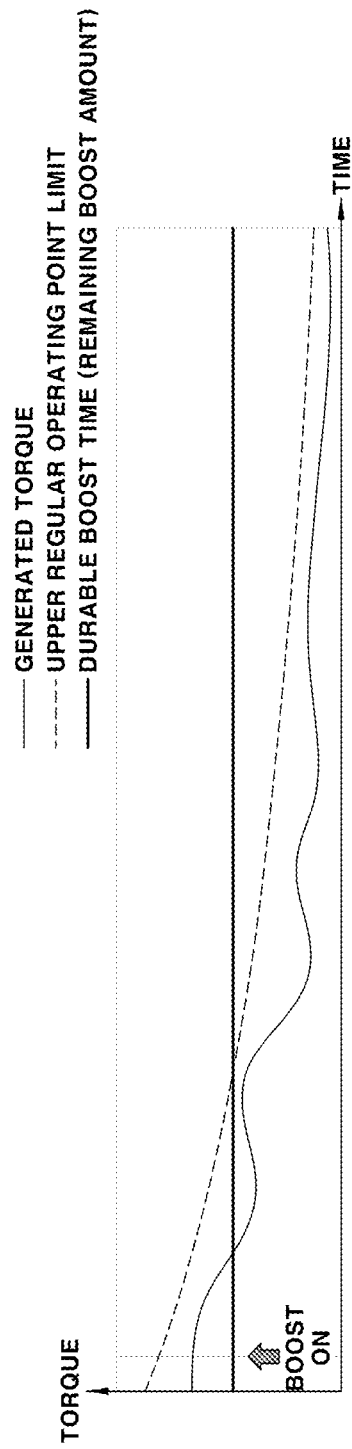

FIG. 6, FIG. 7, and FIG. 8 are diagrams exemplarily showing the state in which a durable boost time decreases in accordance with drivetrain torque of driving points of drivetrain elements. The durable boost time means a remaining boost amount which may be currently used, particularly, boost-driving is possible.

Boost-driving means driving which is actually performed out of a regular operating point range and may be considered as being performed only in a boost mode, but actual performing of boost-driving is not simply the same meaning as the state of a boost mode entered by operating a button. That is, even though boost mode is entered, boost-driving may not be substantially performed in a boost mode.

'Boost-on' means that there is driver input for entering a boost mode, that is, a button has been operated by a driver, and 'boost-off' means that a durable boost time has been fully consumed, so boost-driving has been finished and a boost mode has been turned off.

In FIG. 6 and FIG. 8, an upper regular operating point limit is indicated by a dotted line and boost-driving is not substantially performed when real-time drivetrain torque is the upper regular operating point limit or less because driving has been performed in a regular operating point range even when a boost mode has been entered (non-boost-driving).

As shown in the figures, a durable boost time is decreased only when boost-driving has been actually performed out of the regular operating point range even when a boost mode has been entered. In the instant case, the durable boost time may be decreased in accordance with a predetermined decrease ratio (inclination) and the decrease ratio of the durable boost time may be determined as a value corresponding to a driving torque excess from the upper regular operating point limit unlike the exemplified figures.

FIG. 6 shows that when boost-driving is continuously used after a boost mode is entered, a durable boost time rapidly decreases and boost is turned off. FIG. 7 shows that when boost-driving is intermittently used after a boost mode is entered, a durable boost time may be further extended, as compared with when boost-driving is continuously used in FIG. 6.

FIG. 8 shows that when boost-driving is not used after a boost mode is entered, a durable boost time is maintained without decreasing, so a boost mode is also not finished and may be maintained.

Although a durable boost time was exemplified above, a map in which a standby extension region and a standby time non-extension region are separated with the upper regular operating point limit and the lower regular operating point limit therebetween may also be used for a boost standby time rather than a durable boost time in the controller 30.

The standby extension region is a boost operation region in which boost-driving is actually performed and the standby time non-extension region is a non-boost-driving region in which boost-driving is not performed. The standby extension region and the standby time non-extension region each include a driving torque region and a regenerative torque region.

The operating point map is input and stored in advance in the controller 30 and is used to determine and change a boost standby time. The controller 30 monitors an operating point which is determined in accordance with real-time drivetrain speed and drivetrain torque and determines which one of the standby extension region and the standby time non-extension region the current driving state corresponds to in the operating point based on the monitored current operating point.

The region in which drivetrain torque (driving torque) exceeds the upper regular operating point limit in the driving torque region of the operating point map is a standby extension region, and the region in which drivetrain torque (regenerative torque) is less than the lower regular operating point limit in the regenerative torque region of the operating point map is a standby extension region. When defined without separating driving torque and regenerative torque, when the absolute value of drivetrain torque exceeds the absolute value of the upper regular operating point limit and the absolute value of the lower regular operating point limit, it may be determined as a standby extension region.

A region within the regular operating point range is a standby time non-extension region and a region out of the regular operating point range is a standby time extension region. Accordingly, when the current operating point is positioned in a standby time extension region out of the regular operating point range, a boost standby time is extended. On the other hand, when the current operating point is positioned in a standby time non-extension region which is within the regular operating point range, a boost standby time is not extended.

In the controller 30, the increment/decrement or an increase/decrease ratio of a boost standby time may be determined as a value corresponding to the difference between drivetrain torque and the upper regular operating point limit and the lower regular operating point limit (which is an excess from regular torque (output)).

As described above, the controller 30 monitors in real time the operating points of drivetrain elements, and does not increase and maintains a boost standby time when the current operating point is in a regular operating point range. The controller 30 increases a boost standby time only when the current operating point comes out of a regular operating point range and boost-driving is actually performed.

Figure 9:
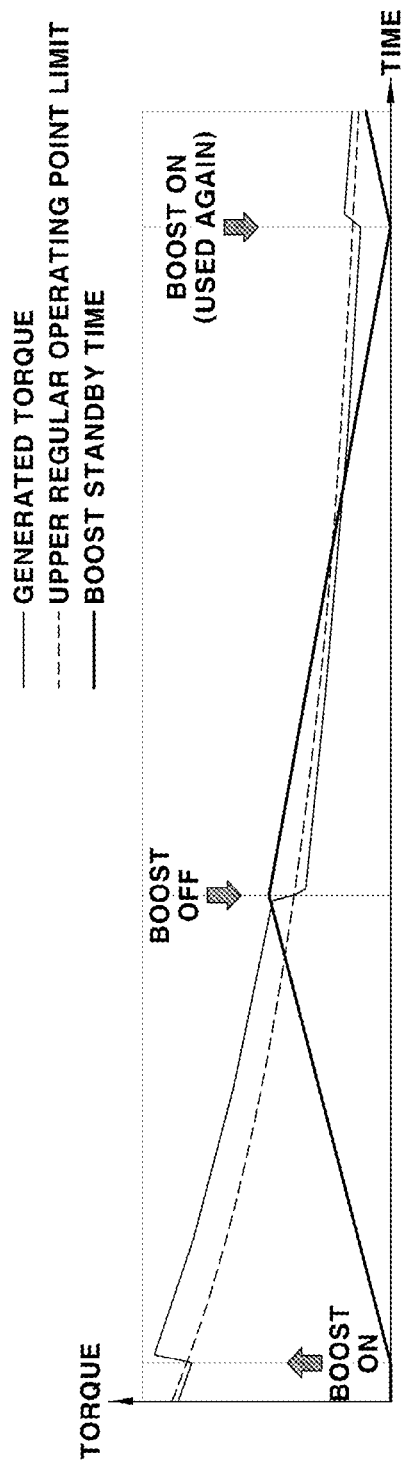
FIG. 9, FIG. 10 and FIG. 11 are diagrams exemplarily showing the state in which a boost standby time increases in accordance with drivetrain torque of operating points of drivetrain elements.
Figure 10:
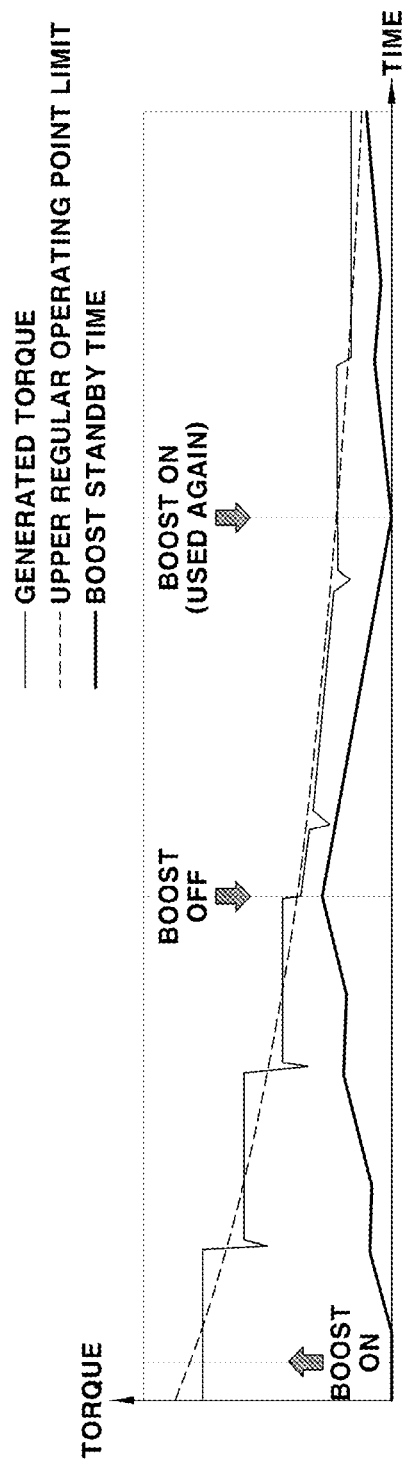
Figure 11:
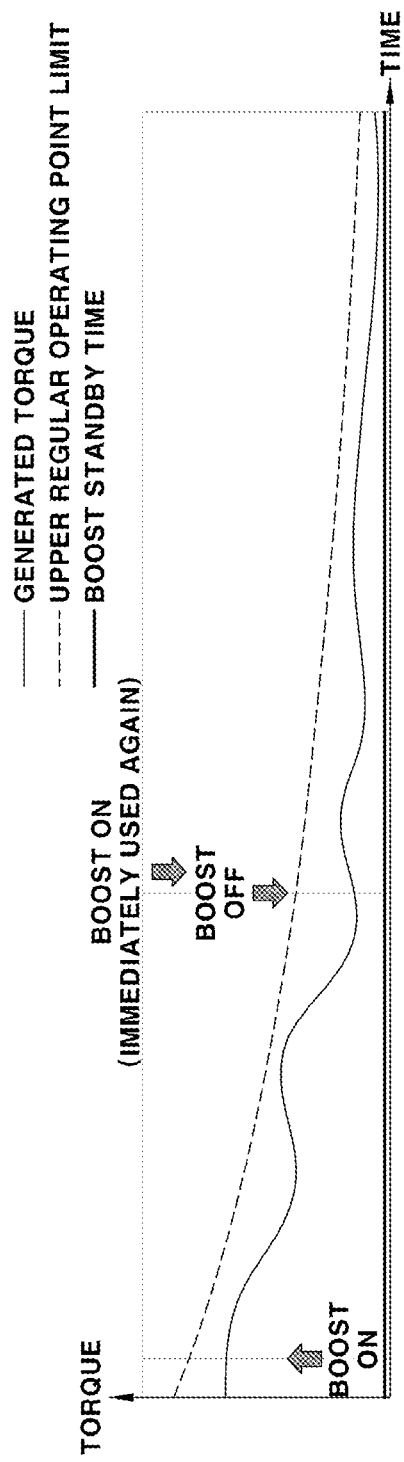

FIG. 9, FIG. 10 and FIG. 11 are diagrams exemplarily showing the state in which a boost standby time increases in accordance with drivetrain torque of driving points of drivetrain elements. As shown in the figures, a boost stand by time is extended only when boost-driving has been actually performed out of the regular operating point range even when a boost mode has been entered. In the instant case, the boost standby time may be increased in accordance with a predetermined increase ratio (inclination) and the increase ratio of the boost standby time may be determined as a value corresponding to a driving torque excess from the upper regular operating point limit unlike the exemplified figures.

Referring to FIGS. 9 to 11, it is shown that a boost standby time at a boost-off time point (cool time, remaining time until next available boost) is a next available boost-on (boost re-use) time and a boost rest time.

FIG. 9 shows that when boost-driving is continuously used after a boost mode is entered, a boost standby time rapidly increases, so boost-on (boost re-use) is possible only when a long boost standby time passes from a boost-off time point.

FIG. 10 shows that when boost-driving is intermittently used after a boost mode is entered, the boost standby time is less extended in comparison to when boost-driving is continuously used in FIG. 9, so that the boost standby time may be shorter at a boost-off time point.

FIG. 11 shows that when boost-driving is not used after a boost mode is entered, the boost standby time is not increased and maintained at a minimum value (e.g., 0), so a driver can immediately turn on (use again) a boost later when he/she wants.

Next, in relation to drivetrain durability, a method of enables the model year or durability state of a vehicle to influence a durable boost time and a boost standby time may be applied. When there are durability state variables estimated internally or from a total mileage or a model year, it is possible to derate a durable boost time using drivetrain durability which is obtained from the variables. Furthermore, it is possible to further extend a boost standby time for vehicles of which the durability is more deteriorated using drivetrain durability which is obtained from the variables.

As for the battery SOC, there is a situation in which an output amount may be limited in a specific battery SOC period to manage the lifespan of a battery. Such a battery characteristic may be considered, and to the present end, it is possible to set a plurality of SOC periods in advance by dividing the entire battery SOC range into several periods, and change in real time a durable boost time and a boost standby time in accordance with an SOC range to which the current battery SOC pertains of the plurality of SOC periods.

When the current battery SOC is in a preset battery SOC period, a controller may set a boost standby time as infinite. The preset battery SOC period may be a battery SOC range in which boost-driving is impossible. The fact that a boost standby time is infinite means a state in which a boost cannot be used again, that is, a state in which a boost mode cannot be entered again and boost-driving cannot be used again.

A control method for a boost mode according to an exemplary embodiment of the present disclosure was described in detail above, and as described above, the boost mode control according to an exemplary embodiment of the present disclosure includes changing a boost-driving relevant time using driving state variable information of a vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control method for a boost mode of a vehicle, the control method including:
    entering, by a controller, the boost mode so that boost-driving is performed in response that the controller receive an input of boost mode-on from a user;
    obtaining, by the controller, real-time driving state variable information while the vehicle is driven in the boost mode;
    increasing or decreasing, by the controller, a durable boost time in accordance with the obtained real-time driving state variable information; and
    displaying, by the controller, a boost standby time which is changed, on a display device of the vehicle,
    wherein the durable boost time is a remaining time for which the boost-driving of the vehicle can be performed after the boost mode is entered.

2. The control method of claim 1, further including:
    determining, by the controller, whether the displayed durable boost time fully elapses after the boost mode is entered; and
    automatically turning off, by the controller, the boost mode when the durable boost time fully elapses.

3. The control method of claim 1, wherein the controller is configured to make a boost standby time for entering again the boost mode later and using again the boost-driving later be displayed on the display device after automatically turning off the boost mode, and to prohibit entering the boost mode and the boost-driving before the displayed boost standby time fully elapses.

4. The control method of claim 3, wherein the controller is configured to decrease the boost standby time displayed on the display device over time when the boost mode is turned off.

5. The control method of claim 1, wherein in the increasing or the decreasing of the durable boost time, the controller is configured to decrease the durable boost time only when the boost-driving is actually performed with the boost mode entered.

6. The control method of claim 5,
wherein the controller is configured to decrease the durable boost time in accordance with a predetermined decrement or a predetermined decrease ratio only when the boost-driving is actually performed with the boost mode entered,
wherein the boost-driving is a driving state in which a drivetrain of the vehicle including a driving device configured to drive the vehicle is operated at an operating point exceeding a regular output of an operating point map, and
wherein the controller is configured to determine the decrement or the decrease ratio as a value corresponding to an excessive torque amount of a current operating point exceeding an upper or lower regular operating point limit set in advance in the operating point map.

7. The control method of claim 5, wherein the controller is set to maintain the durable boost time without increasing or decreasing the boost standby time while the boost-driving is not actually performed with the boost mode entered.

8. The control method of claim 1, wherein the controller is configured to determine an initial value of the durable boost time when the boost mode is entered using current driving state variable information or driving state variable information of a past set time.

9. The control method of claim 8, wherein the controller is configured to determine the initial value of the durable boost time in accordance with a wide open throttle (WOT) duration time or a regenerative torque integration value for a setting time before the boost-driving starts to be used, as the driving state variable information for a past set time.

10. The control method of claim 1, wherein the driving state variable information includes at least one of drivetrain temperature, drivetrain speed, drivetrain torque, drivetrain power, drivetrain durability, and a battery State of Charge (SOC).

11. The control method of claim 1, wherein the driving state variable information is at least one of an accelerator pedal input value and a brake pedal input value input from the user.

12. The control method of claim 1,
wherein a plurality of boost modes that is selected by the user through an input device are set in the controller, and
wherein the boost modes are modes in which boost widths, which are values showing an available excessive boost amount from regular output, and initial values of the durable boost time are each differently set.

13. The control method of claim 12, wherein the plurality of boost modes includes:
a first boost mode in which a boost width and an initial value of the durable boost time are each set as a value between a minimum value and a maximum value within preset available ranges, respectively;
a second boost mode in which the boost width is set as a minimum value in a corresponding available range and the initial value of the durable boost time is set as a maximum value in a corresponding available range; and
a third boost mode in which the boost width is set as a maximum value in a corresponding available range and the initial value of the durable boost time is set as minimum value in the corresponding available range.

14. The control method of claim 1, wherein an initial value of the durable boost time in which the boost-driving of the vehicle can be performed is differently set in the controller in accordance with turning-on and turning-off of a virtual shifting function of the vehicle.

15. The control method of claim 1, further including:
increasing or decreasing, by the controller, the boost standby time in accordance with the obtained real-time driving state variable information;
displaying, by the controller, the boost standby time on the display device of the vehicle when the boost mode is turned off; and
displaying, by the controller, the boost standby time while decreasing the boost standby time displayed on the display device over time,
wherein the boost standby time is a standby time from when a previous boost mode is turned off to before entering a next boost mode.

16. The control method of claim 15, further including:
determining, by the controller, whether the displayed boost standby time fully decreases to 0 after the boost mode is turned off; and
entering, by the controller, the boost mode again when the boost standby time fully elapses and the boost mode-on is received from the user.

17. The control method of claim 15, wherein in the increasing or the decreasing of the boost standby time, the controller is configured to increase the boost standby time only when the boost-driving is actually performed with the boost mode entered.

18. The control method of claim 15, wherein the controller is configured to determine an initial value of the boost standby time for entering again the boost mode later using driving state variable information in an immediately previous boost mode or a boost-driving usage in an immediately previous boost mode.

19. The control method of claim 15,
wherein a plurality of boost modes that is selected by the user through an input device are set in the controller, and
wherein the boost modes are modes in which boost widths, which are values showing an available excessive boost amount from regular output, and initial values of the boost standby time are each differently set.

20. The control method of claim 15, wherein an initial value of the boost standby time for entering again the boost mode later is differently set in the controller in accordance with turning-on and turning-off of a virtual shifting function of the vehicle.

* * * * *